United States Patent
Butler et al.

(10) Patent No.: US 11,198,202 B2
(45) Date of Patent: Dec. 14, 2021

(54) MACHINING FIXTURE WITH QUICK RELEASE LEVER

(71) Applicant: Caterpillar Inc., Peoria, IL (US)

(72) Inventors: James L. Butler, Iuka, MS (US); Kenneth L. Mask, Rienzi, MS (US); Steve B. Barnett, Booneville, MS (US); Joey R. Bain, Rienzi, MS (US)

(73) Assignee: Caterpillar Inc., Peoria, IL (US)

( * ) Notice: Subject to any disclaimer, the term of this patent is extended or adjusted under 35 U.S.C. 154(b) by 217 days.

(21) Appl. No.: 16/682,026

(22) Filed: Nov. 13, 2019

(65) Prior Publication Data

US 2020/0078892 A1    Mar. 12, 2020

Related U.S. Application Data

(62) Division of application No. 15/377,623, filed on Dec. 13, 2016, now abandoned.

(51) Int. Cl.
| | |
|---|---|
| *B25B 5/04* | (2006.01) |
| *B23Q 7/00* | (2006.01) |
| *B25B 11/00* | (2006.01) |
| *B25B 5/00* | (2006.01) |
| *B23Q 3/06* | (2006.01) |
| *B25B 5/14* | (2006.01) |
| *B23P 6/02* | (2006.01) |

(52) U.S. Cl.
CPC ............. *B23Q 7/006* (2013.01); *B23Q 3/061* (2013.01); *B23Q 3/062* (2013.01); *B25B 5/003* (2013.01); *B25B 5/006* (2013.01); *B25B 5/04* (2013.01); *B25B 5/147* (2013.01); *B25B 11/00* (2013.01); *B23P 6/02* (2013.01)

(58) Field of Classification Search
CPC combination set(s) only.
See application file for complete search history.

(56) References Cited

U.S. PATENT DOCUMENTS

| | | | |
|---|---|---|---|
| 1,292,735 A | 1/1919 | Elliott | |
| 3,403,482 A | 10/1968 | Rataiczak | |
| 3,920,234 A | 11/1975 | Blatt | |
| 5,234,295 A | 8/1993 | Jackson et al. | |
| 5,970,829 A | 10/1999 | Conley | |
| 6,290,219 B1 | 9/2001 | Barbosa | |
| 8,025,275 B2 | 9/2011 | Wong | |
| 8,584,335 B2 * | 11/2013 | Tsang | B25B 7/02 29/237 |
| 2015/0121794 A1 | 5/2015 | Koetje | |

* cited by examiner

*Primary Examiner* — David P Bryant
*Assistant Examiner* — Nirvana Deonauth
(74) *Attorney, Agent, or Firm* — Brannon Sowers & Cracraft

(57) ABSTRACT

A fixture for supporting a workpiece during a machining operation is disclosed. The fixture may include a seat configured to receive the workpiece. The fixture may further include a quick release lever mounted to the fixture and configured to displace the workpiece from the seat.

16 Claims, 4 Drawing Sheets

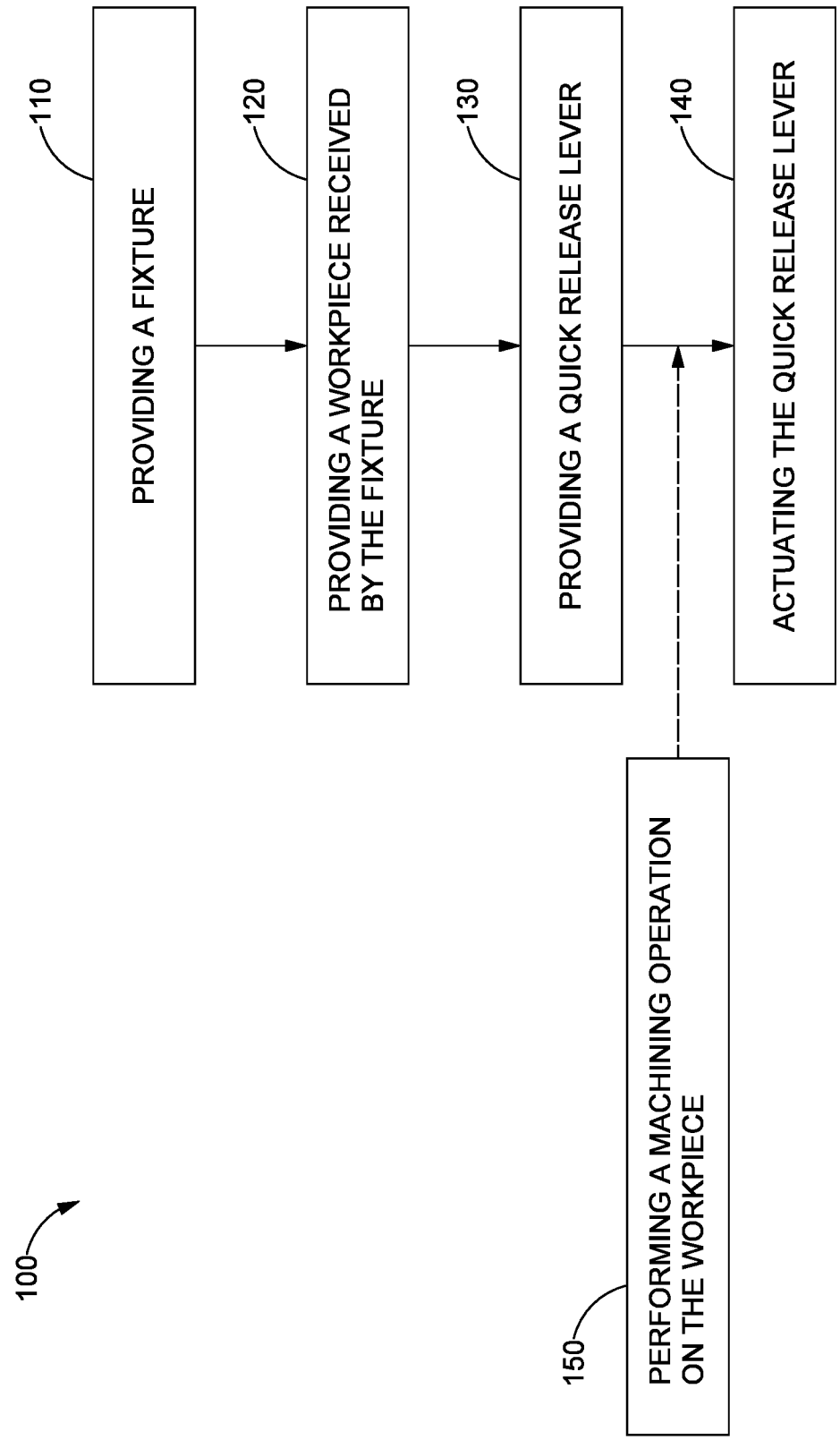

MACHINING FIXTURE WITH QUICK RELEASE LEVER

TECHNICAL FIELD

The present disclosure generally relates to a fixture for holding a workpiece during a machining operation and, more particularly, relates to a fixture having a quick release lever mounted thereon for removing a workpiece from the fixture.

BACKGROUND

Remanufacturing is a rapidly growing industry and philosophy. Remanufacturing means salvaging or removing used manufactured components, e.g., engine parts, and processing the components in a manufacturing environment where they are efficiently and completely repaired and prepared for further life. The remanufactured components may then be returned to customers for additional service or used in rebuilt engines, for example. Remanufacturing extends the life of products, which results in cost savings, economy of resources and environmental benefits, as well as creating new revenue sources for manufactures, machinists and mechanics. Of course, to retain their value, remanufactured components must be returned to a commercially and technically acceptable state. The quality of remanufactured products is typically as good as, and in some cases better than, the original new product.

The automotive industry remanufactures a large variety and volume of engine components. Remanufactured parts may include, for example, pistons, bearings, valve bridges, valve components, brake drums, cylinders, cylinder heads, pump components, crankshafts, etc. During the remanufacture process, parts to be repaired may undergo multiple machining operations including, milling, grinding, drilling, shaping and/or heat treatment. The part being repaired in the remanufacturing process is commonly referred to as a workpiece. Many machining operations are directed to removing material from a workpiece in a controlled manner; and many parts used in modern machine systems need to have a relatively exact size, configuration, alignment of features or factors such as surface finish to function properly in a service environment. Much of modern-day machining is carried out by automated computer numerical control (CNC), in which computers are used to control the movement and operation of the mills, lathes, and other cutting machines. Such "high precision" machining generally refers to techniques for cutting, grinding and other forms of workpiece modification where tolerances can be relatively tightly controlled.

In order to repair the workpiece through a machining process, a fixture may be required to immobilize the workpiece and secure it for the high precision application of a machining tool. Fixtures for positioning and maintaining workpieces relative to a metal working tool are well known in the manufacturing industry (for example, U.S. Pat. No. 3,403,482 discloses a fixture for pistons). Such fixtures are designed to hold a particular workpiece so that suitable machining of the workpiece may be accomplished. For example, a workpiece may be mounted at one or more locations on a fixture and immobilized on the fixture using a clamping member or similar means. Because workpieces may vary in size and shape, a different fixture is normally required for each different workpiece, and custom building of fixtures for particular workpieces is common. In many cases, the fixture is used to immobilize the workpiece while the cutting tool moves horizontally or vertically relative to the workpiece.

In recent years, increasing attention has been paid to the use of high precision machining techniques in the growing field of remanufacturing. Improvements in the remanufacturing processes are regularly taking place; however, certain challenges remain. As described above, precise sizing and finish are required for remanufactured parts to not only be accepted in the market, but also to function properly. The physical demands placed on remanufactured parts are readily apparent. If the remanufacturing process damages a component further, or differently, the remanufacturing process is rendered futile. For example, in a machining operation, a workpiece is mounted to a fixture for milling, grinding or any other machining process. If removal of the workpiece from the fixture damages the surface or structure of the repaired workpiece, the remanufacturing of that component is likely in vain.

This potential drawback has been observed in the remanufacturing of pistons, for example. Specifically, a piston mounted on a fixture for a machining operation may unintentionally become stuck to the fixture during the machining operation, rendering the piston immovable by the machinist after the machining operation has concluded. This may be the result of the physical demands and pressures exerted on workpieces during machining operations. This difficulty has, in the past, required a machinist or other personnel to manually knock the piston loose from the fixture using a sledge or dead blow hammer, for example. Such pummeling of the piston obviously presents the undesired potential of damaging the surface and/or structure of the remanufactured workpiece, thereby rendering the entire remanufacturing process moot. Specifically, the shape of the piston may change so much after banging it loose from the fixture that it no longer has the desired dimensions. In addition, the fixture itself may also be struck in the process of removing the workpiece and therefore inadvertently damaged. Finally, the use of a hammer or other tool by a machinist in the remanufacturing environment may present safety risk to all personnel present in the work environment. Accordingly, it would be beneficial to provide a solution for efficiently removing workpieces from fixtures, thereby preserving the integrity of both the workpiece and the fixture, as well as the security of the workplace.

SUMMARY

In accordance with one aspect of the present disclosure, a fixture for supporting a workpiece during a machining operation is disclosed. The disclosed fixture may include a seat configured to receive the workpiece. In addition, the fixture may include a quick release lever mounted to the fixture and configured to displace the workpiece from the seat.

In accordance with another aspect of the present disclosure, a quick release lever for mounting to a fixture for use in a machining operation is disclosed. The quick release lever may include a handle disposed at a first end of the lever, the handle configured for manual engagement. The disclosed quick release lever may further include a contact surface disposed at a second end of the lever, the contact surface configured to contact and displace a workpiece mounted on the fixture. In addition, the quick release lever may include a point of attachment disposed between the handle and the contact surface, the point of attachment configured to receive a fastener for pivotally mounting the lever to the fixture.

In accordance with another aspect of the present disclosure, a method of removing a workpiece from a fixture for use in a machining operation is disclosed. The disclosed method may include the steps of providing a fixture, and providing a workpiece received by the fixture. In addition, the method may include the step of providing a quick release lever mounted to the fixture, the quick release lever having a handle configured for manual engagement and contact surface configured for contacting the workpiece. Finally, the method may include the step of actuating the quick release lever to displace the workpiece from the fixture.

These and other aspects and features of the present disclosure will be better understood when read in conjunction with the accompanying drawings.

BRIEF DESCRIPTION OF THE DRAWINGS

FIG. 4 is a block diagram illustrating a method for removing a workpiece from a fixture according to the teachings of the present disclosure.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

The present disclosure is directed to a fixture for supporting a workpiece during a machining operation, the fixture having a quick release lever mounted thereon. While the disclosed embodiments of fixtures and quick release levers are described in a remanufacturing setting, this disclosure is equally applicable in any work environment where fixtures for supporting workpieces are employed. In addition, while the fixture described and depicted in this disclosure is supporting a piston, this disclosure may be applicable to fixtures for any workpieces, including bearings, valve bridges, valve components, cylinders, pump components, etc. Any fixture, including custom made fixtures, may be adapted with the quick release lever of this disclosure. Likewise, any fixture base may be adapted with a seat to receive any particular workpiece, the seat adapted to work in cooperation with the disclosed quick release lever. Although not shown in the Figures, it should be appreciated that the disclosed fixture may be mounted to a stationary base, and a machining device may move horizontally or vertically or otherwise relative to the workpiece mounted on the fixture. Likewise, the teachings of this disclosure may also be applied where a lathe is employed.

Figure 1:
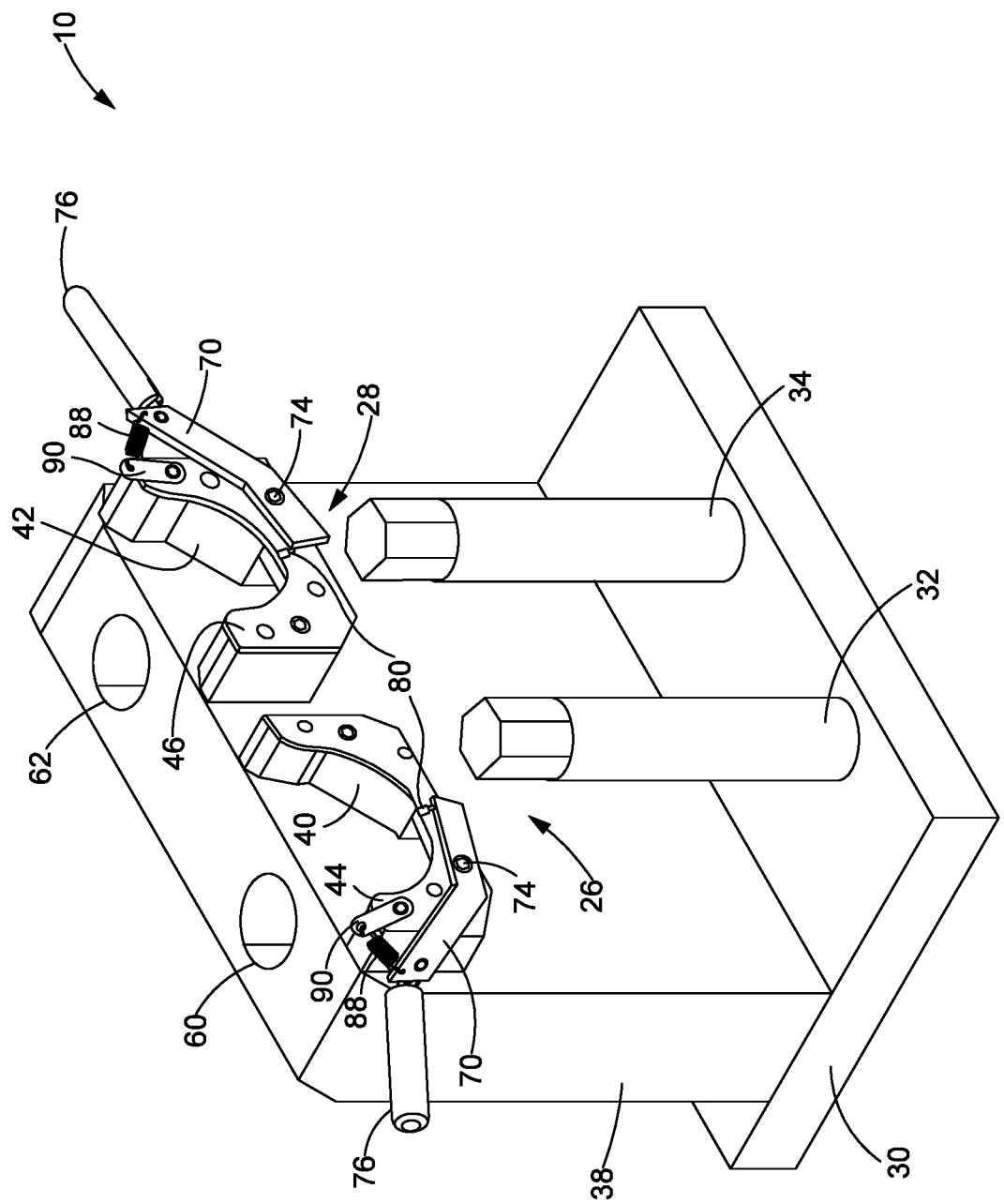
FIG. 1 is a perspective view of an exemplary fixture on which workpieces may be mounted for a machining operation, the fixture including two exemplary quick release levers.
Figure 2:
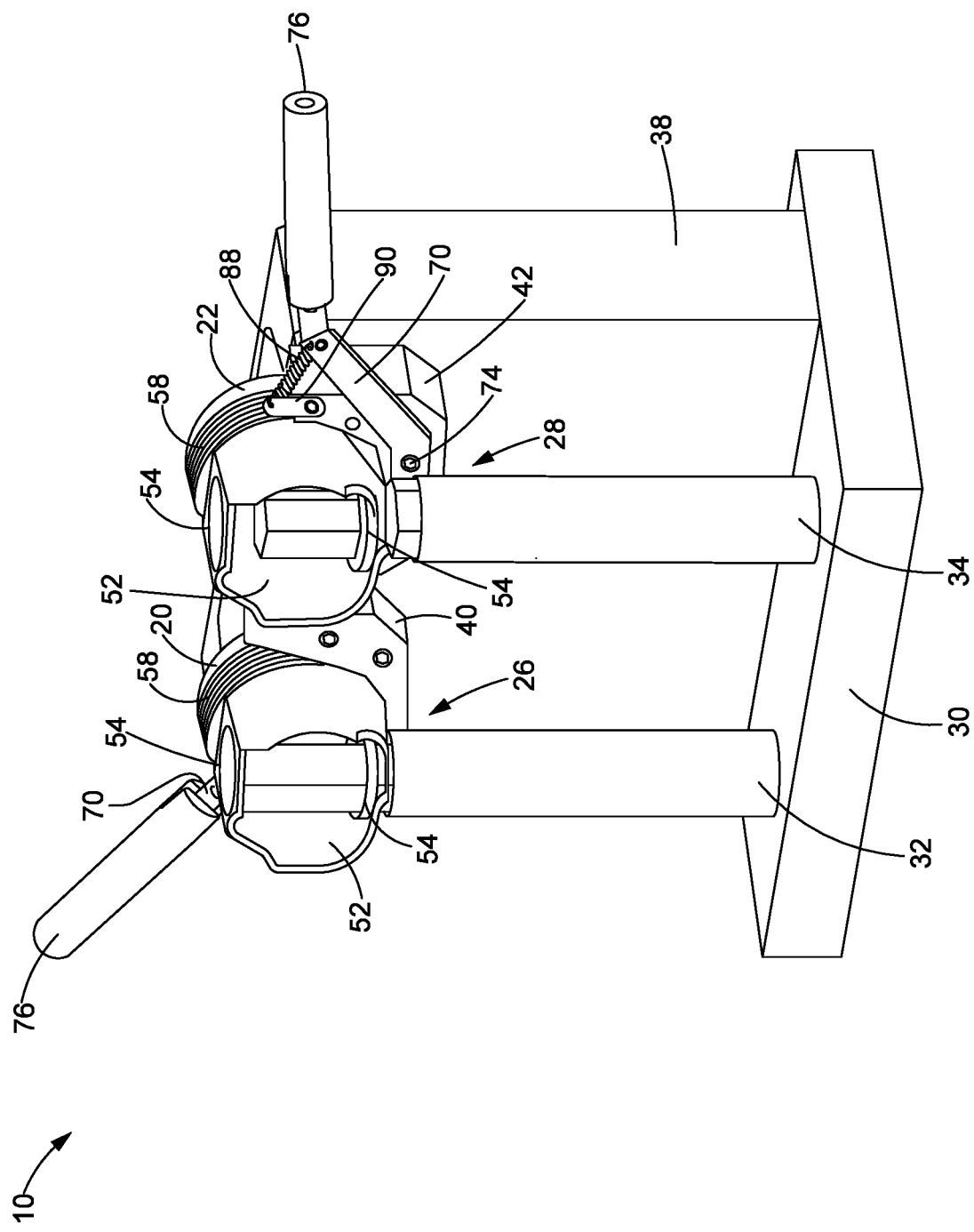
FIG. 2 is a perspective view of the fixture of FIG. 1 illustrating an exemplary workpiece mounted thereon as well as the displacement of another exemplary workpiece from the fixture by one of the quick release levers.

FIG. 1 illustrates a fixture 10 for supporting two workpieces during a machining operation. The machining operation may involve cutting, grinding and/or other forms of workpiece modification. Specifically, as illustrated in FIG. 2, the fixture is intended to support two pistons 20, 22 for a machining operation. The two pistons 20, 22 may be machined at the same time, or the pistons may be machined independent of one another at alternate times. For example, the machining device may work to repair the piston 20 in the first position 26 while an already repaired piston 22 in the second position 28 is removed and replaced with an unrepaired piston. Thereafter, the machining device may shift to the unrepaired piston in the second position 28 to work thereon while the repaired piston 20 in the first position 26 is removed and replaced by an unrepaired piston. In this manner, the machining device may alternate between the two positions 26, 28 repairing pistons while a machinist exchanges repaired pistons for unrepaired pistons.

Referring to FIGS. 1 and 2, the disclosed fixture 10 may include a fixture base 30 on which two vertically extending pin bore locators 32, 34 are positioned. The fixture 10 may further include a vertically extending support plate 38 on which first and second seats 40, 42 are disposed. The seats 40, 42 may be integral with the support plate 38 or may be mounted to the support plate 38 by any number of manners known in the art. Each of the seats 40, 42 may include, opposite the support plate 38, relatively thin seat plates 44, 46, which help to further secure and immobilize the workpieces received in the seats 40, 42. These seat plates 44, 46 may be secured to the seats 40, 42 by bolts or by any other commonly known fastening manner. As illustrated in FIG. 2, the workpieces received in the seats 40, 42 of the fixture 10 are pistons 20, 22. Among other features, the pistons 20, 22 may include a crown or head (not shown), a piston skirt 52 and pin bores 54 in opposite sides of the piston skirt 52. The pistons 20, 22 may also include ring grooves 58. It is this portion of the pistons 20, 22 having the ring grooves 58 that is received in the seats 40, 42 of the fixture 10. When the seat plates 44, 46 are included, the seat plates 44, 46 may fit directly into one of the ring grooves 58 of the pistons 20, 22. In this manner, the pistons 20, 22 may be further secured in the seats 40, 42.

The seats 40, 42 are specifically designed to receive pistons having the exact shape of the illustrated pistons 20, 22. However, it should be appreciated that the seats 40, 42 may be interchangeable with other seats for accommodating pistons of different dimensions or elements. Alternatively, seats for receiving other parts, e.g., valves or cylinders, for machining may instead be mounted on the fixture 10. In this manner, the fixture 10 is adaptable for different pistons, as well as wholly different workpieces. In addition, the seats 40, 42 depicted in this disclosure are generally symmetrical and can therefore be used in either the first position 26 or the second position 28, and can also potentially be flipped such that the opposite face of the seat is mounted to the support plate 38. Likewise, seat plates 44, 46, also being generally symmetrical, may be alternated between first and second positions 26, 28, and/or flipped.

When positioning in the seats 40, 42, the pistons 20, 22 may also be received onto and centered by the vertically extending pin bore locators 32, 34. Specifically, as the pistons 20, 22 are situated in the seats 40, 42, the pin bore locators 32, 34 extend through the pin bores 54 of the piston skirt 52. In this manner, the pistons 20, 22 are certain to be well centered in seats 40, 42, as required for the high precision machining operations to be performed thereon. While not pictured in the Figures, the fixture 10 may also include clamping members received at positions 60, 62. Such clamping members may lock down onto the pistons 20, 22 further securing and immobilizing the pistons 20, 22 for the machining operation. While also not readily apparent in the Figures, once the pistons 20, 22 are immobilized in the seats 40, 42 and ready for the machining operation, the pin bore locators 32, 34 may be downwardly displaced and therefore removed from the piston skirt 52 and the piston bores 54 in advance of the machining operation. After the machining operation has taken place, the pin bore locators 32, 34 may be raised and again inserted into the piston skirt 52 and piston bores 54 before dismounting the piston 20, 22 from the fixture 10.

Figure 3:
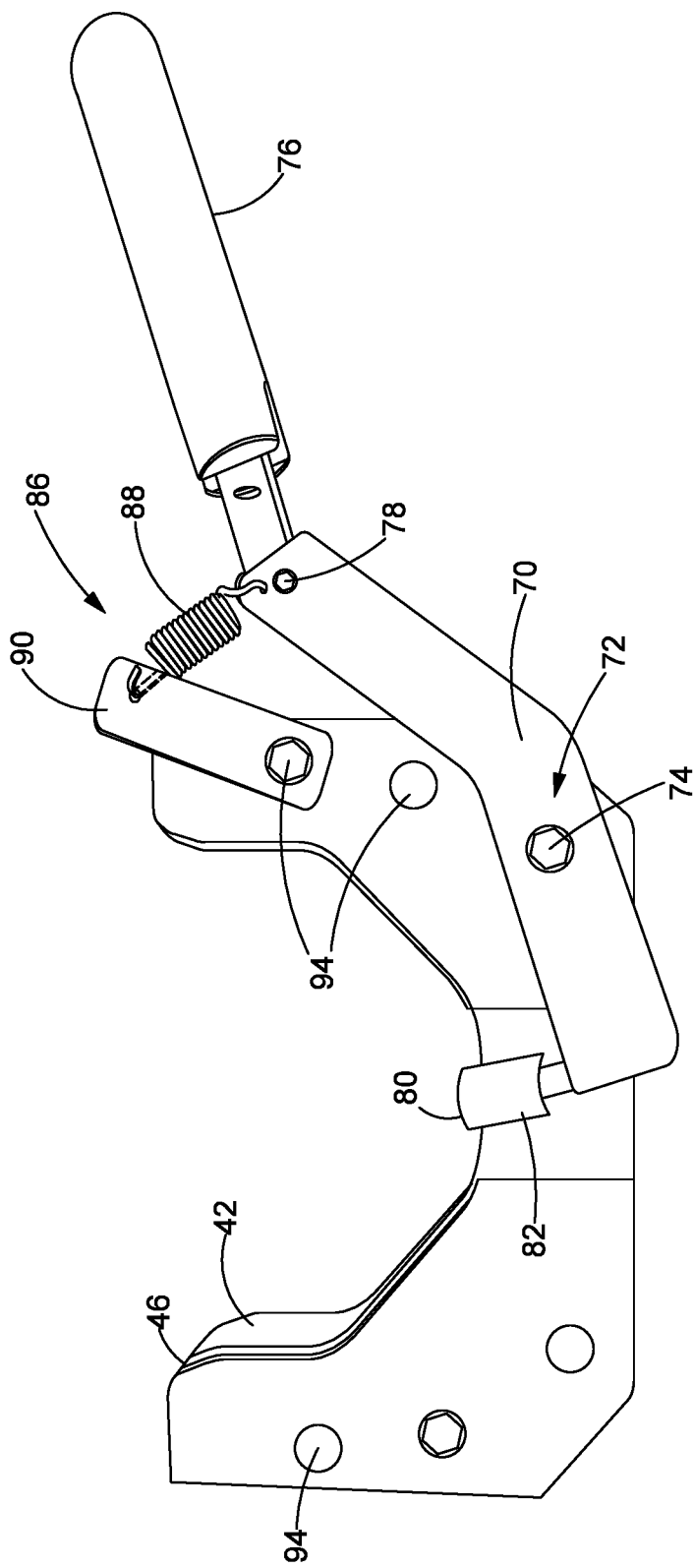
FIG. 3 is a perspective view of the quick release levers of FIGS. 1 and 2 mounted to a portion of the fixture.

FIGS. 1, 2 and 3 illustrate a quick release lever 70 configured to displace the workpiece from the fixture 10. The quick release lever 70 may be mounted to one or both seats 40, 42 of the fixture 10. FIG. 1, which depicts the fixture 10 without workpieces, includes two quick release levers 70 mounted to the seats 40, 42 in the first and second positions 26, 28. Both quick release levers 70 of FIG. 1 are in a non-actuated position. Alternatively, FIG. 2, which depicts the fixture 10 with pistons 20, 22, includes the same two quick release levers 70 mounted to the seats 40, 42 in the first and second positions 26, 28. However, in FIG. 2, the quick release lever 70 in the first position 26 is in a non-actuated position while the quick release lever 70 in the second position 28 is in an actuated position. Accordingly, the quick release lever 70 of the second position 28 is illustrated as displacing the piston 22 from the seat 42. Finally, FIG. 3 illustrates the seat 42 independent of the fixture 10, the seat 42 having the quick release lever 70 mounted thereon. While the lever 70 is illustrated as mounted to the seats 40, 42, it should be appreciated that the lever 70 may be mounted elsewhere on the fixture 10 so long as it is capable of functioning to displace a workpiece from the fixture 10.

Turning to the features of the quick release lever 70, a point of attachment 72 of the lever 70 may receive a fastener 74 used to pivotally mount the lever 70 to the seats 40, 42. The fastener 74 may be a bolt with a bushing, or one of many other fasteners known in the industry for pivotally joining parts. The lever 70 includes at a first end a handle 76 configured for manual engagement. The handle 76 may be integral with the lever 70 or may be attached by any means known in the art. As seen in FIGS. 1 and 2, the handle 76 may extend outwardly from the fixture in either an actuated or a non-actuated position, the actuated position resulting from the manual movement of the handle 76 downward by a machinist or other personnel. While not depicted as such in the Figures, the lever 70 may include a device 78 that allows the handle 76 to be folded in a downward direction relative to the remainder of the lever 70 when the fixture 10 is not being used. For example, the device 78 may be a bolt that when loosened allows the handle 76 to be pivoted down. Alternatively, the device 78 may be a track (not shown) at the first end of the lever 70 on which the handle 76 may slide and thereafter fold in a downwardly direction. One of many devices known in the industry may be employed for folding the handle 76 down, thereby reducing the size of the fixture 10. Among other advantages, reducing the size of the fixture 10 may be beneficial for storage purposes.

An opposite, second end of the lever 70 includes a contact surface 80 extending in an upward direction and configured to contact and displace a workpiece mounted on the fixture 10. As opposed to the remainder of the lever 70, which may be fabricated from any tooling steel, for example, the contact surface 80 may be the top surface of an ultra-high-molecular-weight (UHMW) polyethylene pin 82 mounted to the lever 70 by any manner known in the industry. For example, the pin 82 may receive a bolt or any other known fastener for attaching the pin 82 to the lever 70. Alternatively, the second end of the lever 70 may be coated with a contact surface material rather than having an independent element mounted thereto. In such a case, the coated second end of the lever may have an upwardly extending design configured to reach and engage the workpiece when the lever 70 is in an actuated position. The design of the second end of the lever 70 having the contact surface 80 may be altered depending on the particular fixture and the particular workpiece at hand. Further, the contact surface 80 or pin 82 may be another material known in the art, such as, but not limited to, other thermoplastics, phenolics, nylon, acetal, polypropylene, polyurethane, polytetrafluoroethylene (PTFE), etc. In all cases, the contact surface 80 should be durable, shock resistant, rigid and non-abrasive so as not to damage the surface of the workpiece when contacting and displacing the workpiece.

As best seen in FIG. 3, the quick release lever 70 may also include a device 86 to automatically return the lever 70 to the non-actuated position. Specifically, after manually pivoting the handle 76 downward in order to raise the contact surface 80 and displace a workpiece from the seat 42, the device 86 automatically shifts the handle 76 upward to its non-actuated, resting position. This non-actuated position is depicted in FIG. 1 (both positions 26, 28) and in the first position 26 of FIG. 2. With reference to FIG. 3, the device 86 for automatically returning the lever 70 to its non-actuated position may include a spring 88 disposed between the lever 70 and the seat 42. To facilitate the attachment of the spring 88, a bracket 90 may also be used. Specifically, the bracket 90 may be fastened by any manner known in the art to the seat 42 while also receiving the spring 88. In this manner, the spring 88 is disposed between the seat 42 and the lever 70 without having to be directly attached to the seat 42. The bracket 90 may be positioned at other attachment points 94 on the seat 42 depending on the size of the bracket 90, the size of the spring 88, the particular workpiece received in the seat 42 or other parameters of the fixture 10. In all cases, the spring 88 may be stretched or expanded to allow actuation of the lever 70 to contact and displace the workpiece; however, the spring 88 automatically returns to its resting position after the expansion force is released, thereby also returning the lever 70 to its non-actuated position. In this manner, the lever 70 and the handle 76 are generally maintained in a raised, non-actuated position leaving the contact surface 80 lowered and the seat 42 physically unencumbered and available to receive a workpiece.

The disclosed quick release lever 70 may be reversible and therefore may be pivotally mounted at either the first position 26 or the second position 28 of the fixture 10. Specifically, both of the seats 40, 42, being generally symmetrical, may receive opposite sides of the same lever 70. For example, the lever 70 may be flipped and the fastener 74 may be employed to pivotally mount the lever 70 at the point of attachment 72 onto the seat at the opposite position. Therefore, this quick release lever 70 design is not only versatile with regard to the numerous fixtures and workpieces it may cooperate with, but it is interchangeable on opposite sides the disclosed fixture 10 as well. This symmetrical design of the seats 40, 42 as well as the reversible nature of the lever 70, may help to avoid risks of dysfunction from incorrect installation/orientation of the elements of the fixture 10.

FIG. 4 is a block diagram illustrating a method 100 of removing a workpiece from a fixture 10 for use in a machining operation. With reference to the drawings generally, the method 100 for removing a workpiece may include: a first step 110 of providing a fixture 10; and a second step 120 of providing a workpiece received by the fixture 10. As described above, the fixture 10 may include seats 40, 42 for receiving the workpiece. Also, the fixture 10 and the seats 40, 42 may be specifically designed to receive the pistons 20, 22 of certain dimensions and elements though the fixture 10 may be adaptable to other workpieces. Thereafter, the method 100 for removing a workpiece may include: the step 130 of providing a quick release lever 70 pivotally mounted to the fixture 10, the quick release lever having a handle 76 configured for manual engagement and a contact surface 80 configured for contacting the workpiece. The handle 76 and the contact surface 80 may be disposed at opposite ends of the lever 70, and the lever 70 may be mounted to the fixture 10 at a point of attachment 72 between the handle 76 and the contact surface 80. The quick release lever 70 may also include a spring 88 that functions to automatically maintain the lever 70 in a non-actuated position. Finally, the method 100 for removing a workpiece may include: the step 140 of actuating the quick release lever 70 to displace the workpiece from the fixture 10. As described above, this step 140 requires the manual downward shifting of the lever 70 by a machinist or other personnel, which in turn raises the contact surface 80 of the lever 70 to contact and displace the workpiece from the fixture 10. Before the step 140 of actuating the quick release lever 70, the method may include the step 150 of performing a machining operation on the workpiece. It is during this machining operation that the workpiece may become stuck on the fixture 10, thereby requiring the actuation of the quick release lever 70. Alternatively, the workpiece may become stuck due to bad placement on the seat 40, 42 before the machining operation ever takes place. While the step 140 of actuating the quick release lever 70 will typically occur after the step 150 of performing the machining operation, the step 150 is not critical to this method 100 and it is foreseeable that the step 140 of actuating the quick release lever 70 may, in some circumstances, take place absent the performance of any machining operation on the workpiece.

While the above detailed description and drawings are made with reference to a specific fixture for supporting a workpiece during a machining operation and a method for removing a workpiece from such a fixture, it is important to note that the teachings of this disclosure can be employed on other fixtures in manufacturing or remanufacturing environments or in any other applications where fixtures may be employed.

INDUSTRIAL APPLICABILITY

The disclosed fixture 10 and the quick release lever 70 may have applicability in manufacturing or remanufacturing environments where machining operations are taking place. Fixtures having the disclosed quick release lever 70 may be designed to receive any number of workpieces for machining, including bearings, valve bridges, valve components, cylinders, pump components, etc. It is common in the industry for fixtures to be custom designed for individual workpieces. While the presently disclosed fixture 10 includes a custom design seat 40, 42 for receiving a piston 20, 22, an alternatively designed seat may be mounted to the fixture 10 for receiving any other workpiece for machining. Further, the disclosed quick release lever 70 may work in combination with any such seat, designed to receive pistons or otherwise, to contact and displace the workpiece from the fixture 10.

The disclosed fixture 10, having a quick release lever 70 mounted thereon, and method 100 enable a machinist or other personnel to remove workpieces from a fixture after a machining operation has taken place without damaging the newly machined workpiece. Referring to the drawings generally, a workpiece such as a piston 20, 22, may be secured and immobilized on the fixture 10 so that a machining operation may be performed on the piston 20, 22, thereby transforming an old, used piston into a remanufactured piston having a quality equal to or better than that of a new piston. The disclosed fixture 10 includes seats 40, 42 for receiving pistons 20, 22. The seats 40, 42 may include seat plates 44, 46, which help to further secure and immobilize the pistons 20, 22 for the machining operation. Specifically, the ring grooves 58 of the pistons 20, 22 are received in the seats 40, 42. This fit may include the seat plates 44, 46 being received into one of the ring grooves 58, thereby securing the piston in a precise location as required for the machining operation. In addition, when placing the pistons 20, 22 onto the fixture 10, the pin bores 54 of the pistons 20, 22 are received onto the pin bore locators 32, 34 of the fixture 10. Specifically, the pin bore locators 32, 34 traverse the pin bores 54 and the piston skirt 52, as seen in the first position 26 of FIG. 2, thereby further aiding in the correct positioning of the pistons 20, 22. As described above, clamps (not shown) may also be employed at positions 60, 62 to further lock the pistons 20, 22 in place for the machining operation.

Because the machining operation, which may include cutting, grinding and other forms of workpiece modification, applies significant physical demands on the pistons 20, 22, the pistons 20, 22 may become stuck or otherwise immovable from the fixture 10 after the machining operation has concluded. Previously, removal of such workpieces from fixtures may have required the machinist to strike the workpiece with a hammer or other device to dislodge the workpiece from the fixture. This method presents risks to the machinist's safety, to the fixture and to the workpiece that receives such blows. Among other things, a precise shape, dimensions and finish of the workpiece are required for the workpiece to be considered commercially and technically acceptable. In order to avoid potential damage to the workpiece, the presently disclosed fixture 10 for piston remanufacturing includes the quick release levers 70 for easily and safely removing the pistons 20, 22 from the fixture 10 without damaging the same. In operation, a machinist need only grasp and shift the handle 76 of lever 70 downward to in turn contact and displace the piston 20, 22 from the seat 40, 42. Specifically, the downward movement of the handle 76 causes the lever 70 to pivot at its point of attachment 72, resulting in a corresponding upward movement of the contact surface 80. The contact surface 80 applies a displacing force against an underside of the piston 22 thereby lifting the piston 22 off of the seat 42, as illustrated in the second position 28 of FIG. 2.

As described above, the contact surface 80 may be the upper surface of a pin 82 mounted to the lever 70, which may be of any thermoplastic know for use in the industry that is durable, rigid and non-abrasive so as not to damage the surface of the workpiece when contacting and displacing the workpiece. While a fixture for piston machining is specifically described and illustrated in this disclosure, a fixture for any workpiece may be adapted with the disclosed quick release lever 70. Further, while the lever 70 of the present disclosure applies the displacing force to an underside of the workpiece, it should be appreciated that the lever 70 may be mounted in any configuration that allows one to apply a force through the lever 70 to displace a workpiece, depending on how exactly the workpiece is received onto the fixture at hand. Once the quick release lever 70 has been shifted downward, or actuated to remove the piston 20, 22 from the fixture 10, the lever 70 is automatically returned to its non-actuated or resting position. Specifically, the spring 88 disposed between the seat 40, 42 and the lever 70, having expanded when the lever 70 is actuated, then returns the lever 70 back to the non-actuated position once the machinist releases the lever 70. In this manner, the piston 20, 22 may be removed and fixture 10 is available to receive an additional piston for machining.

The presently improved method of removing a workpiece from a fixture allows a machinist to quickly remove and replace a workpiece for a machining operation. As explained above, workpieces may become stuck or otherwise immovable from a fixture by the machinist alone due to the machining operation performed on the workpiece, or due to inaccurate placement of the workpiece on the fixture. The disclosed fixture and method reduce the risk of damaging a stuck workpiece by avoiding the application of unnecessary force to the workpiece by a hammer or other tool with the intention of dislodging the workpiece from the fixture. Therefore, not only does the disclosed method increase the efficiency of the machining operation as a whole, but this method also maintains the integrity and quality of the workpiece and the fixture. Furthermore, the disclosed method and fixture, having a quick release lever mounted thereon, eliminate any potential safety risks posed by a machinist using a hammer to dislodge workpieces in the remanufacturing environment.

All references to the disclosure or examples thereof are intended to reference the particular example being discussed at that point and are not intended to imply any limitation as to the scope of the disclosure more generally. Also, it will be apparent to those skilled in the art that various modifications and variations can be made to the fixture and/or quick release lever of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A fixture for supporting a workpiece during a machining operation, comprising:
   a fixture base;
   a support plate vertically extending from the fixture base and having a seat positioned on a first side of the support plate, the seat configured to receive the workpiece; and a quick release lever mounted to the fixture and configured to displace the workpiece from the seat;
   wherein the workpiece is a piston and the fixture includes a pin bore locator vertically extending from the fixture base for positioning in a pin bore in a piston positioned on the seat; and a seat plate positioned on the seat opposite to the support plate and positioned to fit in a ring groove in a piston positioned on the seat.

2. The fixture of claim 1 wherein the quick release lever is pivotally mounted to the fixture.

3. The fixture of claim 2 further comprising a spring disposed between the quick release lever and the fixture, the spring configured to maintain the quick release lever in a non-actuated position.

4. The fixture of claim 1 wherein the quick release lever comprises a handle disposed at a first end of the quick release lever, the handle configured for manual engagement, and a contact surface disposed at a second end of the quick release lever, the contact surface configured for contacting the workpiece.

5. The fixture of claim 4 wherein the contact surface comprises a UHMW polyethylene.

6. The fixture of claim 1 wherein:
   the seat includes a first seat, and the fixture further includes a second seat positioned adjacent to the first seat, such that the fixture is adapted to simultaneously receive two workpieces; and
   the fixture further includes a second quick release lever configured to displace a workpiece from the second seat.

7. The fixture of claim 6 wherein the first seat and the second seat are symmetrical, such that either can be mounted to the fixture in place of the other.

8. The fixture of claim 1 wherein the quick release lever further includes:
   a handle disposed at a first end of the quick release lever, the handle configured for manual engagement;
   a contact surface disposed at a second end of the quick release lever, the contact surface configured to contact and displace a workpiece mounted on the fixture; and
   a point of attachment disposed between the handle and the contact surface, the point of attachment configured to receive a fastener for pivotally mounting the quick release lever to the fixture.

9. The fixture of claim 8 wherein the quick release lever further includes a lever body having a first longitudinal edge and a second longitudinal edge each extending from a first end to a second end of the lever body, and the lever body having a bent configuration between the first end of the lever body and the second end of the lever body.

10. The fixture of claim 9 wherein the quick release lever further includes a pin having the contact surface, the contact surface disposed at the second end of the lever body, and the pin projects from the lever body such the contact surface is spaced outboard of the lever body in a direction away from the first longitudinal edge and configured to apply a pushing force to a workpiece mounted on the fixture to displace the workpiece from the seat.

11. The fixture of claim 10 wherein the point of attachment includes a bore formed in the lever body between the handle and the pin.

12. The fixture of claim 11 further comprising a fastener positioned in the bore to pivotally mount the lever body to the fixture at the point of attachment, such that the handle and the contact surface each pivot about the point of attachment when the quick release lever is actuated to apply the pushing force to the workpiece.

13. The fixture of claim 9 wherein a first portion of the lever body from the point of attachment to the first end of the lever body is longer than a second portion of the lever body from the point of attachment to the second end of the lever body, and the handle is configured to told when not in use.

14. The fixture of claim 9 further comprising an automatic return device configured to couple with the lever body to maintain the lever body in a non-actuated position.

15. The fixture of claim 14 wherein the automatic return device includes a spring, and further comprising a bracket attached to the automatic return device and attached to the fixture.

16. A fixture for supporting a workpiece during a machining operation, comprising:
- a fixture base;
- a support plate vertically extending from the fixture base and having a first seat on a first side of the support plate;
- the first seat configured to receive the workpiece;
- a first quick release lever mounted to the fixture and configured to displace the workpiece from the first seat;
- a handle disposed at a first end of the first quick release lever, the handle configured for manual engagement;
- a contact surface disposed at a second end of the first quick release lever, the contact surface configured to contact and displace a workpiece mounted on the fixture;
- a point of attachment disposed between the handle and the contact surface;
- a fastener pivotally mounting the first quick release lever to the fixture at the point of attachment;
- a second seat positioned on the first side of the support plate adjacent to the first seat and configured to receive a second workpiece; wherein the fixture is configured to simultaneously receive the workpieces;
- a second quick release lever mounted to the fixture and configured to displace the second workpiece from the second seat: and
- wherein the workpiece is a piston and the fixture includes a first vertically extending pin bore locator and a second vertically extending pin bore locator vertically extending from the fixture base for positioning, respectively, in a pin bore in a first piston and a pin bore in a second piston positioned on the first seat and the second seat.

* * * * *